United States Patent

Carreno et al.

[11] Patent Number: 5,593,274
[45] Date of Patent: Jan. 14, 1997

[54] CLOSED OR OPEN CIRCUIT COOLING OF TURBINE ROTOR COMPONENTS

[75] Inventors: Diether E. Carreno, Schenectady; Albert Myers, Amsterdam; Gene D. Palmer, Clifton Park; Philip M. Caruso, Selkirk; Ian D. Wilson, Clifton Park, all of N.Y.; Martin C. Hemsworth, Cincinnati, Ohio

[73] Assignee: General Electric Co., Schenectady, N.Y.

[21] Appl. No.: 414,695

[22] Filed: Mar. 31, 1995

[51] Int. Cl.[6] .................... F01D 5/08; F01D 5/06
[52] U.S. Cl. .............. 415/115; 415/134; 415/135; 415/175; 416/96 R; 285/300
[58] Field of Search .................. 415/114, 115, 415/134, 135, 136, 175; 416/95, 96 R, 198 A; 285/166, 298, 300, 370

[56] References Cited

U.S. PATENT DOCUMENTS

| | | | |
|---|---|---|---|
| 2,339,779 | 1/1944 | Holzwarth | 416/96 R |
| 3,443,790 | 5/1969 | Buckland . | |
| 3,729,930 | 5/1973 | Williams . | |
| 4,184,797 | 1/1980 | Anderson et al. | 416/95 |
| 4,314,442 | 2/1982 | Rice . | |
| 4,424,668 | 1/1984 | Mukherjee . | |
| 4,507,914 | 4/1985 | Rice . | |
| 4,551,063 | 11/1985 | Raschke et al. | 415/115 |
| 4,571,935 | 2/1986 | Rice . | |
| 4,982,564 | 1/1991 | Hines . | |
| 5,149,146 | 9/1992 | Simoni | 285/166 |
| 5,177,954 | 1/1993 | Paul . | |
| 5,224,818 | 7/1993 | Drerup et al. | 415/116 |
| 5,318,404 | 6/1994 | Carreno et al. | 416/95 |

FOREIGN PATENT DOCUMENTS

| | | | |
|---|---|---|---|
| 3509359 | 8/1986 | Germany | 415/134 |
| 43-17121 | 12/1968 | Japan | 416/96 R |
| 53-41818 | 4/1978 | Japan | 285/166 |
| 58-47199 | 3/1983 | Japan | 415/134 |

Primary Examiner—James Larson
Attorney, Agent, or Firm—Nixon & Vanderhye

[57] ABSTRACT

A rotor cooling circuit includes a cooling medium supply reservoir for supplying cooling medium to a plurality of axial passages through the turbine wheel and spacer disc rims. A passageway communicates cooling medium from the reservoir for flow in series and in a serpentine manner in and about the cavities between the wheels and discs. The flows are reunited at a plenum for flowing the cooling medium into first and second stage buckets. Return passages through the rims of the wheels and spacer discs return spent cooling medium from the buckets to a return location external of the rotor. Transition elements between the buckets and spacer plates in the rotor rim accommodate any thermal mismatch between the adjoining buckets and spacer plates to prevent cooling medium leakage at the joints.

20 Claims, 15 Drawing Sheets

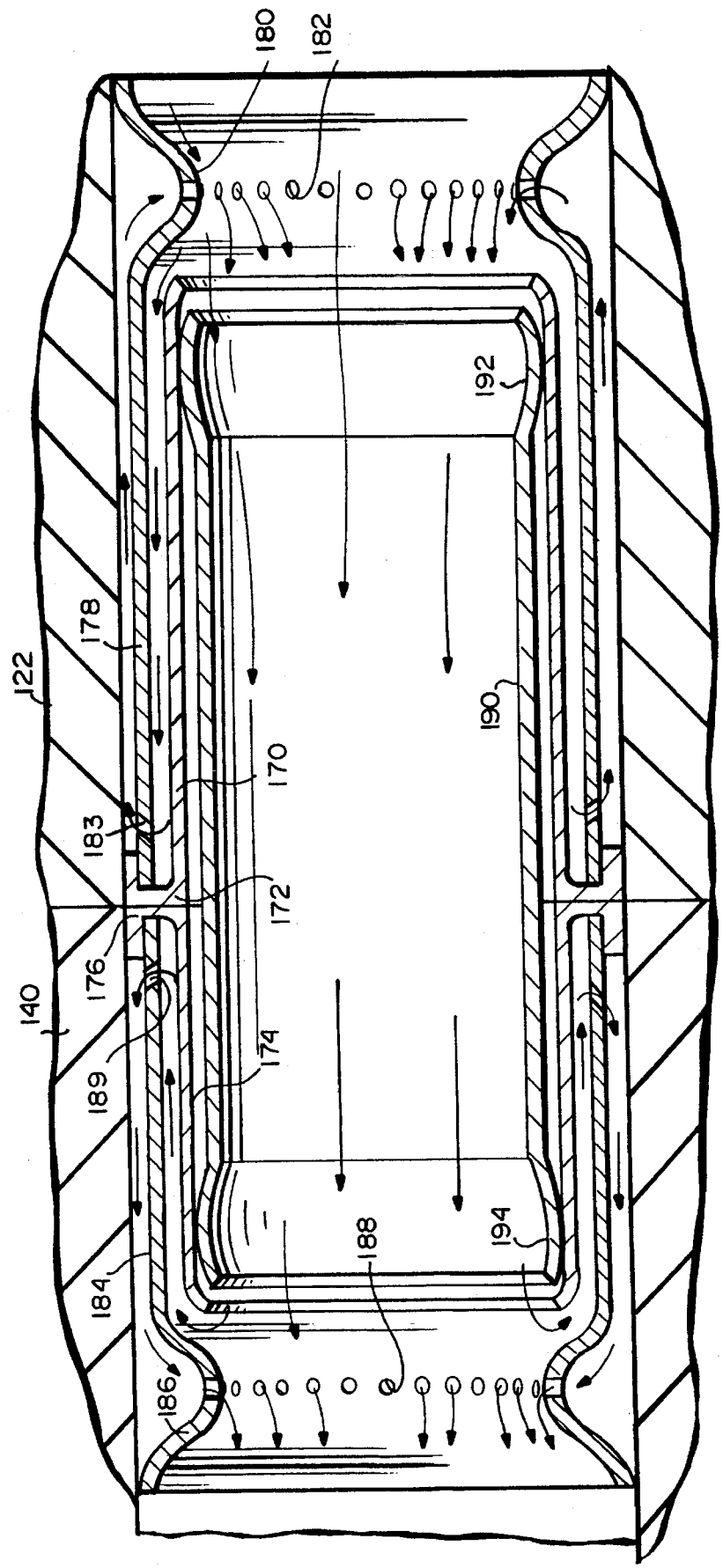

CLOSED OR OPEN CIRCUIT COOLING OF TURBINE ROTOR COMPONENTS

TECHNICAL FIELD

The present invention relates generally to turbines, and particularly to land based gas turbines employing either closed circuit steam-cooling or open or closed circuit air cooling of hot gas path components. More particularly, the present invention relates to closed circuit steam or open or closed circuit air cooling of the rotational parts of the turbine enabling conversion of the turbine rotor between air and steam-cooling.

BACKGROUND

Hot gas path components of gas turbines typically employ air convection and air film techniques for cooling surfaces exposed to high temperatures. High pressure air is conventionally bled from the compressor and the energy of compressing the air is lost after the air is used for cooling. Steam-cooling of hot gas path components has been proposed, utilizing available steam from, for example, the heat recovery steam generator and/or steam turbine components of a combined cycle power plant. Where steam is utilized as the coolant for gas turbine components, there is typically a net efficiency gain inasmuch as the gains realized by not extracting compressor bleed air for cooling purposes (typically in an open cycle configuration) more than offset the losses associated with the use of steam as a coolant instead of providing energy to drive the steam turbine. Steam-cooling is even more advantageous when the steam coolant is provided in a closed circuit whereby the heat energy imparted to the steam as it cools the gas turbine components is recovered as useful work in driving the steam turbine.

Because of the differences in heat transfer characteristics between air and steam, it would be expected that turbine components designed to utilize these cooling mediums would be constructed differently. For example, turbine buckets designed to be cooled by open circuit air cooling would be expected to be substantially different from turbine buckets designed for cooling by closed circuit steam. In the case of steam-cooling, the coolant would be recovered from the turbine buckets to provide useful work elsewhere. In the case of air cooling, the air would typically be discharged from the buckets to the hot gas path. The internal passages which provide the cooling circuits for the rotational hot gas path components would typically be expected to be designed differently.

For a gas turbine to have the flexibility to be cooled with either air or steam (a feature of the present invention described below), it is necessary that cooling circuits be designed to accommodate both cooling mediums. A customer purchasing a simple cycle gas turbine power plant, for example, would need to have the turbine components cooled by air, if there was no available source of alternative coolant. If, however, the customer later expands his plant to an upgraded combined cycle plant, steam becomes readily available as a coolant and it would be advantageous from an efficiency point of view to utilize this steam to cool the turbine. Consequently, a problem to be addressed in the present application is the provision of cooling circuits in the rotational components of a gas turbine which can readily be converted for cooling such components by using either air or steam as the cooling medium.

DISCLOSURE OF THE INVENTION

For discussion purposes, the new turbine described and illustrated herein preferably comprises four stages within an inner shell mounting the first and second stage nozzles as well as the first and second stage shrouds while an outer shell mounts the third and fourth stage nozzles and shrouds. It will be appreciated, however, that a greater or lesser number of turbine stages as well as a different number of nozzle stages and shrouds supported by the inner and outer shells may be provided. Where an air-cooled turbine is provided, it will also be appreciated that cooling air is supplied to the stationary components, e.g., the first and second stage nozzles as part of high pressure air from the compressor. The cooling air is supplied in an open circuit exiting the partitions or vanes of the first and second stage nozzles for film cooling and passage into the hot gas stream. Cooling air may similarly be piped directly though the outer shell to the third stage nozzle while the fourth stage nozzle remains uncooled. Open air-cooled circuits are also provided for the rotational components of the turbine, i.e., the buckets in a conventional manner.

In a closed circuit steam-cooling system for the turbine, cooling steam is provided to each of the nozzle partitions of the first and second stages by way of discrete steam supply and spent cooling steam exit pipes coupled to the partitions through the inner shell and releasably coupled at their outer ends to the outer shell. The present invention particularly addresses the closed circuit steam-cooling supply and spent cooling steam return conduits as well as the open circuit air cooling conduits for the turbine rotor for delivery of the cooling medium (steam or air) to the buckets of the first and second stages as well as to the rotor wheel cavities and the rotor rim.

To summarize the state of the development of this new turbine, the use of inner and outer shells to support stationary components of the turbine which can be converted between air and steam-cooling is described and illustrated in co-pending application Ser. No. 08/414,698 entitled "Removable Inner Turbine Shell with Bucket Tip Clearance Control" (Attorney Dkt No. 839-346), the disclosure of which is incorporated herein by reference. For a complete description of the steam-cooled buckets, reference is made to companion co-pending patent application Ser. No. 08/414,700 entitled "Closed Circuit Steam-Cooled Bucket" (Attorney Dkt. No. 839-352), the disclosure of which is incorporated herein by reference. For a complete description of the steam cooled first and second stage nozzles including stator vanes and associated outer and inner walls, reference is made to companion co-pending patent application Ser. No. 08/414,697, entitled "Turbine Stator Vane Segments Having Combined Air and Steam Cooling Circuits" (Attorney Docket No. 839-354). Air-cooled buckets are well known in the art, for example, reference may be made to U.S. Pat. Nos. 5,340,274; 5,259,730 and 5,232,343. Consequently, it will be appreciated that to effect a conversion in an individual turbine between air and steam-cooling, cooling circuits must be designed for the turbine rotor to accommodate both air and steam-cooling for the rotor and turbine buckets.

To accomplish this in accordance with the present invention, the turbine has a housing defining a plenum about the aft rotor for supplying a cooling medium to a first aft wheel cavity between a cooling supply disc module and the aft turbine wheel, e.g., the fourth-stage turbine wheel. (As used herein, the term "aft" refers to parts of the turbine in a direction downstream of the hot gas flow through the turbine) A plurality of circumferentially spaced, axially extending openings or boreholes are provided in the rims of the wheels and spacer discs between the wheels to accommodate axially extending cooling medium supply passages. Certain of these axially extending passages, e.g., twelve of the twenty-four preferred through holes, are provided with tubes. The tubes are preferably fluted to define discrete pathways. The flow through these pathways supplies cooling medium to the first and second stage buckets in a generally serpentine passageway (including the pathways) and in series through the wheel cavities. These pathways defined between the flutes of the tubes and the walls of the openings thus provide cooling medium into the annular cavities on opposite sides of the wheel discs between adjacent wheels for flow to an inner supply plenum located between the first and second stage wheels and further flow into the first and second buckets. The remaining twelve passages along the rims of the wheels and spacer discs provide through axial bores extending substantially the full length of the rotor for supplying cooling medium directly along axial paths to the inner supply plenum. The two cooling medium supply flows, i.e., the axial and serpentine flows, reunite in the inner supply plenum for flow radially outwardly through slots into an outer supply plenum. This outer supply plenum supplies cooling medium to the buckets of the first and second stages.

Cooling medium return flow is provided by central passages through the fluted tubes when the closed circuit cooling system is used. Thus, in the closed circuit cooling system where steam is utilized as the cooling medium, steam flows from the aft plenum into the aft wheel cavity and splits for flow through the axial and serpentine passages and passageway, reunites at the inner supply plenum, and flows radially outwardly to the outer supply plenum and to the first and second stage buckets. Return steam flows from the first and second stage buckets into a return plenum between the first and second stage wheels and from that plenum radially inward along slots to the central return passages of the fluted tubes and then further radially inward at the aft end of the rotor for discharge through a coaxial passageway.

For air cooling, the same components as used in the steam-cooled system may be used in the air-cooled system. In the air-cooled system, the air is supplied to the wheel and disc rims as well as the first and second stage buckets similarly as in the steam supply circuit. That is, the air is initially split between axial flows along the passages through the wheel and disc rims, and along a serpentine flow passageway through the wheel cavities, and which flows are reunited at the inner supply plenum for flow to the outer supply plenum. Air is also supplied to the first and second stage buckets in the previously described steam return passages, i.e., the central passages of the tubes and the cooling medium return plenum for flow to the first and second stage buckets. Thus, the return passages for the steam cooling circuit are used as supply passages for the air cooling circuit.

In another aspect of the present invention, spoolies are provided in the cooling circuits for transitioning cooling medium between adjacent parts of the rotating components which may be thermally mismatched. For steam-cooling, it is important that steam does not leak into the hot gas path through leakage areas between adjacent rotating parts. Leakage typically occurs where the thermal growth rates of adjacent parts is different. To accommodate for the different thermal growth rates, spoolies are positioned between these parts to effect a flow of the cooling medium through these transition areas without leakage which might otherwise result from the thermal mismatch. The spoolies thus effectively seal these transition areas between the two rotating parts.

In a preferred embodiment according to the present invention, there is provided a turbine comprising a multi-stage rotor having an axis and including a plurality of turbine wheels having rims for mounting turbine buckets and spacer discs having rims, the spacer discs being disposed alternately between the wheels and defining wheel cavities therebetween, the wheels and spacer discs being secured to one another, a reservoir for supplying a cooling medium to the rotor, a plurality of generally axially extending passages through the wheel and spacer disc rims and in communication with the cooling medium supply reservoir for supplying the cooling medium to the turbine buckets of at least one stage of the rotor and the rotor having a passageway in communication with the cooling medium supply reservoir for supplying cooling medium into the wheel cavities and passing the cooling medium therefrom into the turbine buckets of one stage.

In a further preferred embodiment according to the present invention, there is provided a turbine comprising a multi-stage rotor having an axis and including a plurality of turbine wheels having rims for mounting turbine buckets and spacer discs having rims, the spacer discs being disposed alternately between the wheels and defining wheel cavities therebetween, the wheels and spacer discs being secured to one another, a reservoir for supplying a cooling medium to the rotor, a plurality of generally axially extending passages in communication with the cooling medium supply reservoir and passing axially through the wheel and spacer disc rims for supplying the cooling medium to the turbine buckets of at least one stage of the rotor and a plurality of radially inwardly directed passages in communication with the turbine buckets of one stage for flowing spent cooling medium to an axially extending return pathway.

In a still further preferred embodiment according to the present invention, there is provided a transition assembly for sealing between registering ports of adjacent discrete first and second parts, enabling flow of a cooling medium between the parts, comprising tubular bushings sealingly secured at one end to the ports, respectively, at the juncture of the first and second parts and extending into the parts, respectively, the bushings at locations remote from one end thereof being spaced from interior walls of the ports, respectively, and a coaxial tubular element extending within and between the bushings terminating in ends engaging the bushings forming a seal enabling flow of cooling medium between the parts through the tubular element with reduced stress from thermal mismatch between the first and second parts.

Accordingly, it is a primary object of the present invention to provide a novel and improved cooling circuit for a turbine rotor enabling conversion between open circuit air and closed circuit steam cooling.

BRIEF DESCRIPTION OF THE DRAWINGS

FIG. 8 is an enlarged cross-sectional view of a further form of axial spoolie;

BEST MODE FOR CARRYING OUT THE INVENTION

Figure 1:
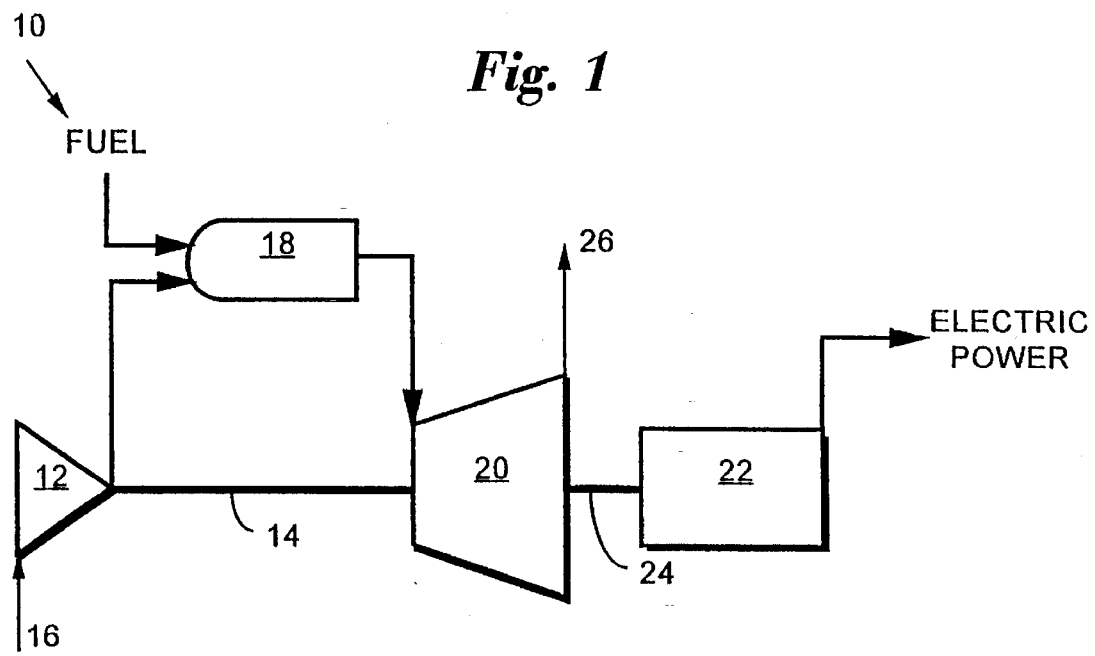
FIG. 1 is a is a schematic illustration of a gas turbine incorporated in the present invention.

FIG. 1 is a schematic diagram for a simple cycle, single-shaft heavy-duty gas turbine 10 incorporating the present invention. The gas turbine may be considered as comprising a multi-stage axial flow compressor 12 having a rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. A typical simple cycle gas turbine will convert 30 to 35% of the fuel input into shaft output. All but 1 to 2% of the remainder is in the form of exhaust heat which exits turbine 20 at 26. Higher efficiencies can be obtained by utilizing the gas turbine 10 in a combined cycle configuration in which the energy in the turbine exhaust stream is converted into additional useful work.

Figure 2:
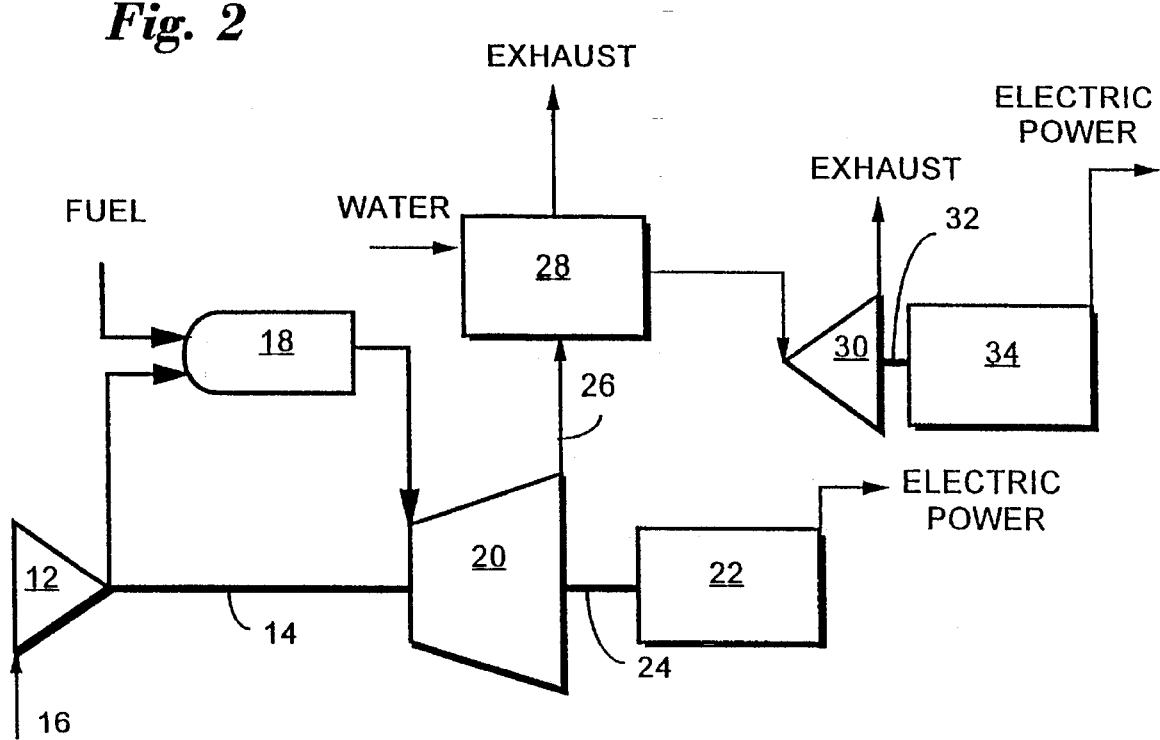
FIG. 2 is a schematic diagram of a combined cycle system incorporated in the present invention and employing a gas turbine and heat recovery steam generator for greater efficiency.

FIG. 2 represents a combined cycle in its simplest form, in which the exhaust gases exiting turbine 20 at 26 enter a heat recovery steam generator 28 in which water is converted to steam in the manner of a boiler. Steam thus produced drives a steam turbine 30 in which additional work is extracted to drive through shaft 32 an additional load such as a second generator 34 which, in turn, produces additional electric power. In some configurations, turbines 20 and 30 drive a common generator. Combined cycles producing only electrical power are in the 50 to 60% thermal efficiency range using the more advanced gas turbines.

Figure 3:
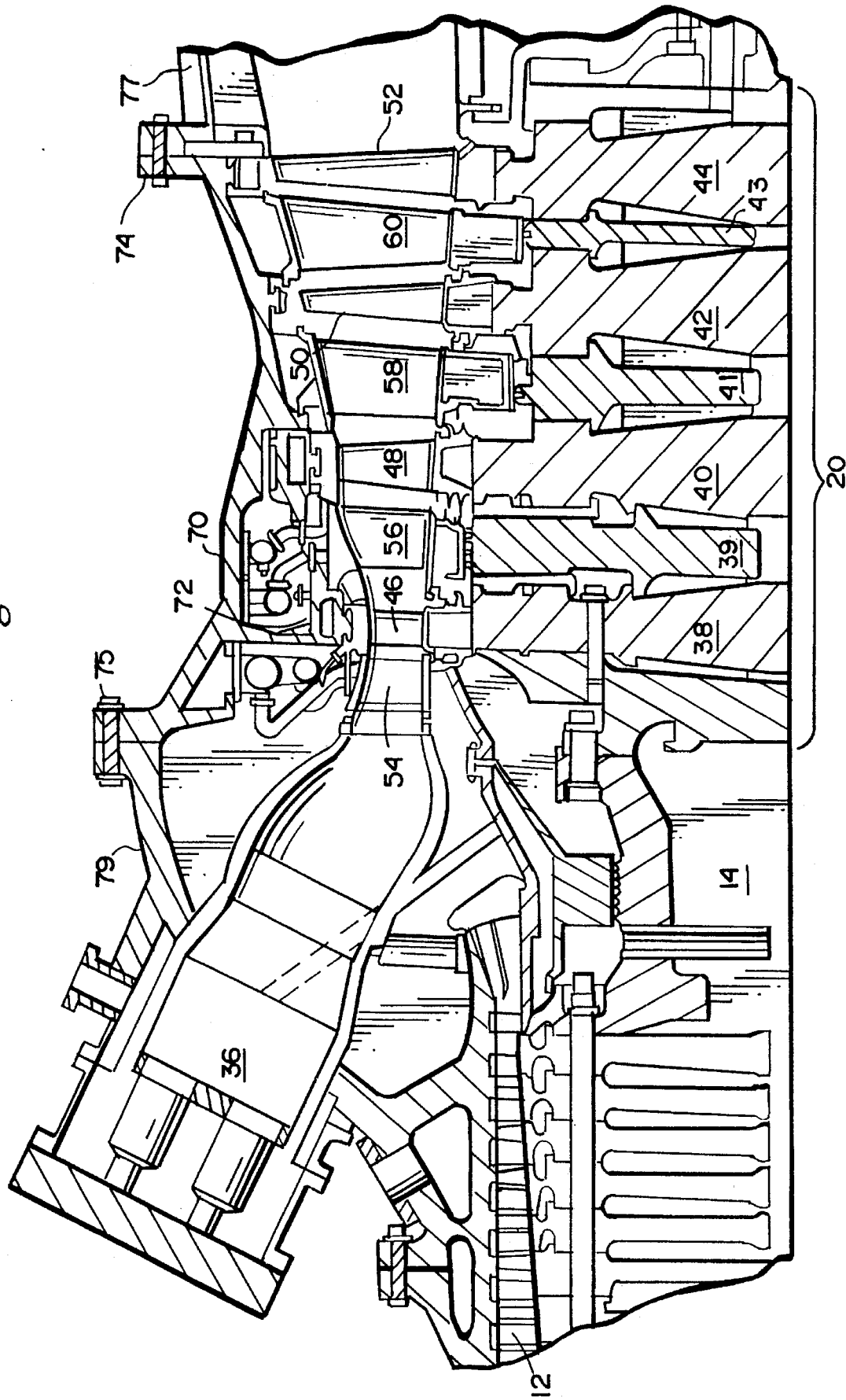
FIG. 3 is a cross-sectional view of a portion of a gas turbine illustrating its combustion, compressor and turbine rotor sections.

FIG. 3 illustrates in greater detail the gas turbine which is the focus of the present invention and which, preferably, is used in the combined cycle configuration of FIG. 2. Air from the compressor 12 is discharged to the combustion cans comprising combustor 18, the combustion cans being located circumferentially about the rotor shaft 14 in the usual fashion, one such "can" being shown at 36. Following combustion, the resultant combustion gases are used to drive the turbine section 20, which includes in the instant example four successive stages represented by four wheels 38, 40, 42 and 44 comprising the turbine rotor and mounted to the rotor shaft 14 for rotation therewith, and each carrying a row of buckets represented, respectively, by blades 46, 48, 50 and 52, which are arranged alternately between fixed nozzles represented by vanes 54, 56, 58 and 60, respectively. The rotor also includes spacer discs 39, 41 and 43 alternately arranged between the bucket wheels. Thus, it will be appreciated that a four-stage turbine is illustrated wherein the first stage comprises nozzles 54 and buckets 46; the second stage, nozzles 56 and buckets 48; the third stage, nozzles 58 and buckets 50; and the fourth stage, nozzles 60 and buckets 52. As in the above-identified patent applications, the first and second stage nozzles 54 and 56 are mounted on an inner shell 72 pinned to an outer shell mounting the third and fourth stage nozzles. The outer shell is removable at the bolt flanges 74 and 75 bolting the outer shell to the turbine housing sections 77 and 79, respectively, whereby the upper outer shell and inner shells 72 are removable from the turbine for access to the hot gas path components.

Figure 4A:
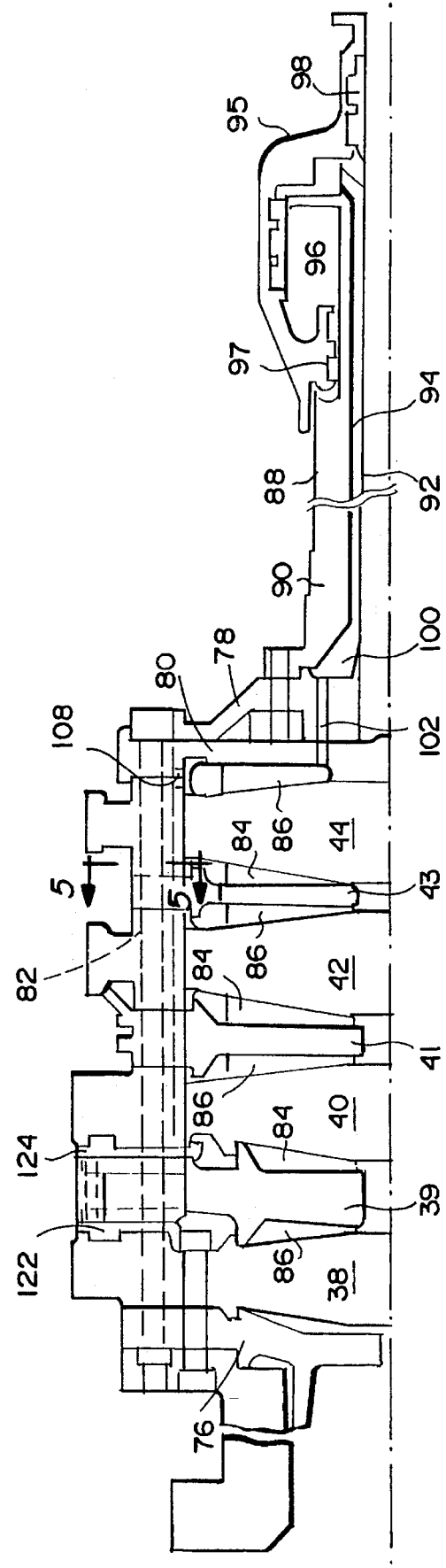
FIGS. 4A–4D are schematic illustrations of the turbine rotor section including portions of an aft rotor arrangement and illustrating the cooling circuits for the turbine rotor.

Referring now to FIG. 4A, a transition disc 76 and an end disc 78 are disposed at opposite ends, respectively, of the turbine rotor. A cooling supply disc module 80 is also disposed between the aft end disc 78 and the fourth stage wheel 44. The wheels and discs are maintained in concentricity through rabbetted fits and the entire turbine rotor assembly is held together by a series of circumferentially spaced axially extending bolts 82 passing through the axially adjoining rims of the wheels and discs. It will be appreciated that seals are provided at the butt joints between the rims of the wheels and spacer discs and that annular cavities 84 and 86 are formed on opposite sides of each spacer disc 39, 41 and 43 with the respective adjoining wheels.

Bolted to the aft end disc 78 is an aft rotor shaft assembly 88 including an outer shaft 90 and a concentrically arranged inner shaft 92 forming an annular passage 94 therebetween. The shafts 90 and 92 rotate with the turbine rotor. A housing 95 forming a stationary part of the turbine defines an annular plenum 96 about outer shaft 90 and has bearings 97 and 98 about shafts 90 and 92, respectively. The plenum 96 provides a reservoir of cooling medium for flow into passage 94 between shafts 90 and 92 and into an aft annular plenum 100 aft of end disc 78. It will be appreciated that the cooling medium supplied to plenum 96 may comprise either steam or air depending upon whether steam or air cooling of the turbine is required. A plurality of circumferentially spaced passages 102 communicate between the aft plenum 100 and the aftmost cavity 86.

Figure 5:
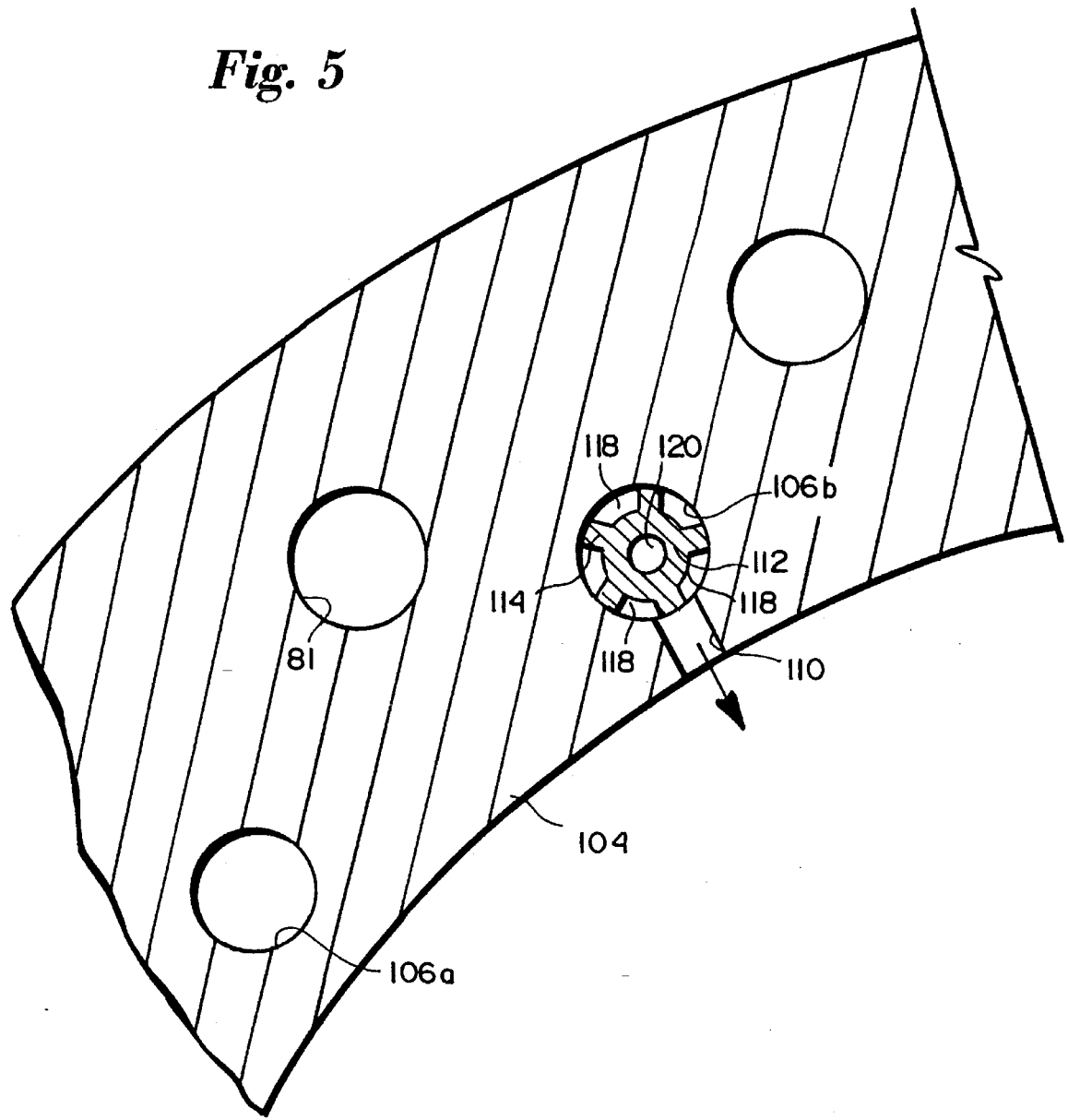
FIG. 5 is an enlarged fragmentary cross-sectional view through a portion of a rotor wheel rim.

Referring now FIG. 5, there is illustrated an enlarged schematic cross-sectional view of a portion of the rim 104 of a wheel 38, 40, 42 or 44. The bolt circle openings 81 for the bolts 82 are illustrated as an outer ring of circumferentially spaced openings about the turbine wheel and spacer disc rims. An inner series of circumferentially spaced, axially extending, boreholes 106 are also provided through the rims of wheels 40, 42 and 44 and spacer discs 39, 41 and 43 terminating adjacent the aft face of first wheel 38 of the rotor, i.e., the holes 106 extend through each of the wheel rims and the rims of the spacer discs except for the first stage wheel 38. While any number of boreholes can be used, twenty-four boreholes are preferable. A certain number of borehole 106a, for example, twelve of the twenty-four boreholes, are clear and constitute through passages for passing a cooling medium axially along the rims of the wheels and discs directly to an inner cooling medium supply plenum described below. The alternating boreholes 106b each have an elongated tube 112 having spokes or flutes 114 projecting radially outwardly at spaced circumferential locations about tube 112 and in interference fit contact with the walls of boreholes 106b. As will be appreciated, the flutes 114 form discrete pathways 118 about the outer surface of each tube 112. It will be appreciated, however, from the ensuing description that tubes of cylindrical or other cross-sectional shapes may be used. Also, the aft ends of the boreholes 106a and 106b communicate with the aft cavity 86 by way of radial slots formed in the forward face of the supply disc module 80.

Each of the wheels 40, 42 and 44 have generally radial inlets and outlets on opposite sides of the wheel in communication with the boreholes 106b and the adjoining annular cavities 84 and 86, an outlet 110 being illustrated in FIG. 5. Thus, the boreholes 106b of wheel 44 lie in communication with the slots of module 80 supplying cooling medium from aft wheel cavity 86 axially along the rim of wheel 44. Wheel 44 also has outlets 110 in communication with boreholes 106b and wheel cavity 84 between spacer disc 43 and wheel 44. Likewise, wheel 42 has inlets 108 in communication with boreholes 106b and the cavity 86 between disc 43 and wheel 42 and outlets 110 in communication with boreholes 106b and cavity 84 between wheel 42 and disc 41. Similarly, wheel 40 has inlets communicating between boreholes 106b and cavity 86 between disc 41 and wheel 40 and outlets communicating with boreholes 106b and cavity 84 between wheel 40 and disc 39. Thus, outlets 110 enables flow of cooling medium radially inwardly along one side of a spacer disc and radially outwardly along the opposite side of such spacer disc into the outlets 108. The first stage wheel 38 has an inner cooling medium annular supply plenum 109 (FIG. 6) communicating with cavity 86 between disc 39 and wheel 38. As will be appreciated from the ensuing description, the flutes form discrete pathways 118 about the outer surface of each tube 112. More particularly, pathways 118 between the flutes 114 of each tube 112 and the interior wall of borehole 106b comprise axially extending passages in communication with the inlets and outlets 108 and 110, respectively, and supply module slots dedicated to supplying cooling medium in series to the turbine wheel-disc cavities 84, 86. As noted below, the central passage 120 through each tube 112 in borehole 106b serves as a closed circuit return passage for the return of spent cooling medium when the turbine is steam-cooled and for supply of cooling air when the turbine is air-cooled. Note, that for closed-circuit steam cooling, steam supply passages 118 isolate the rotor wheel and spacer disc rim structure from the hot spent return steam flowing through the central passage 120.

Figure 4B:
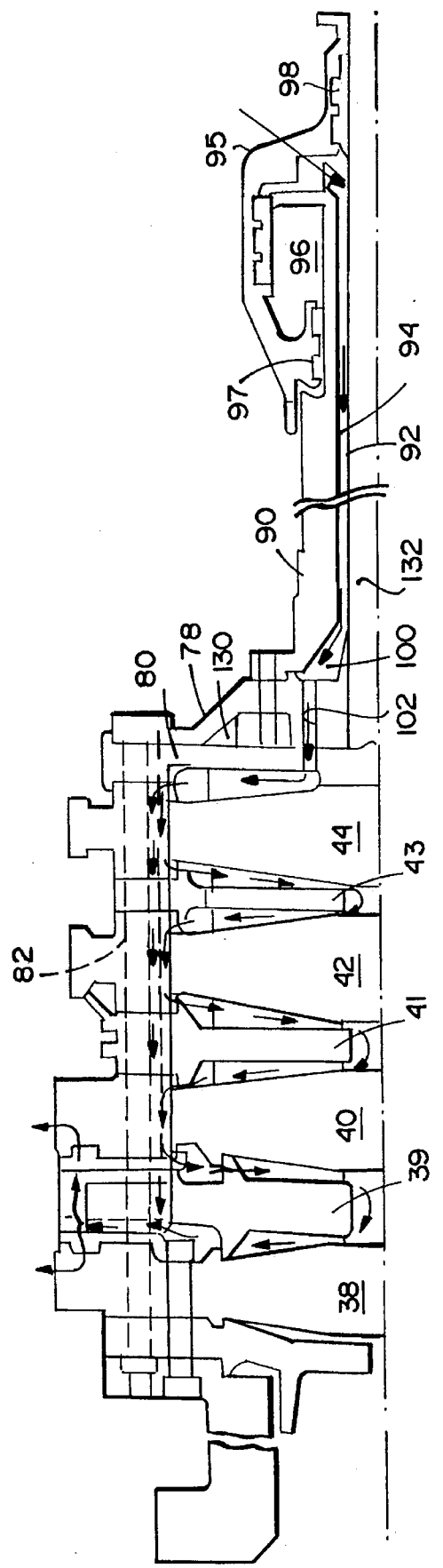
Figure 4C:
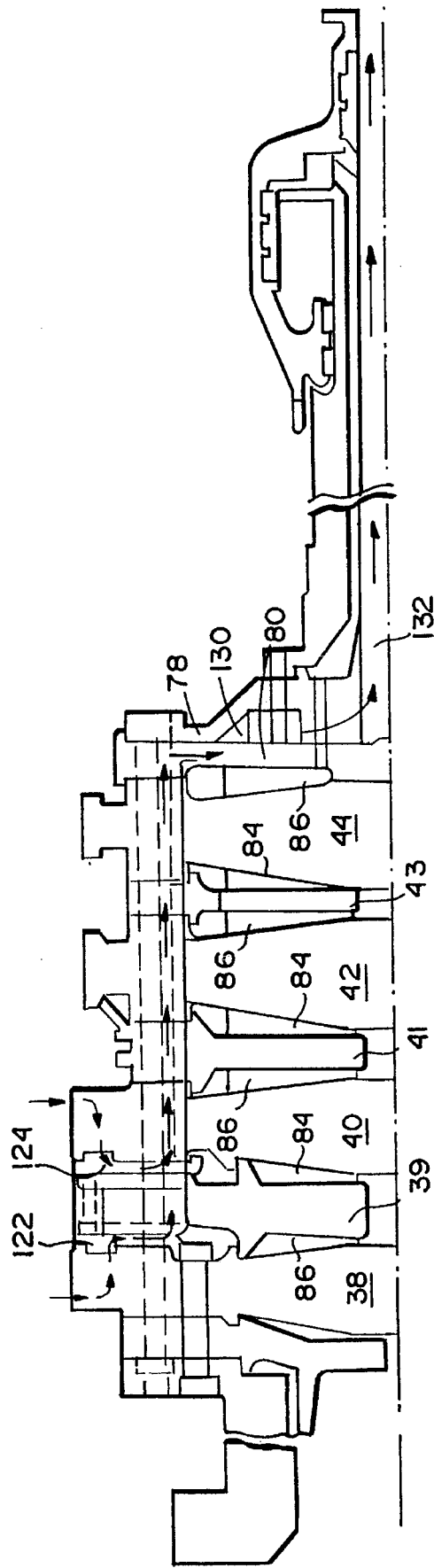
Figure 4D:
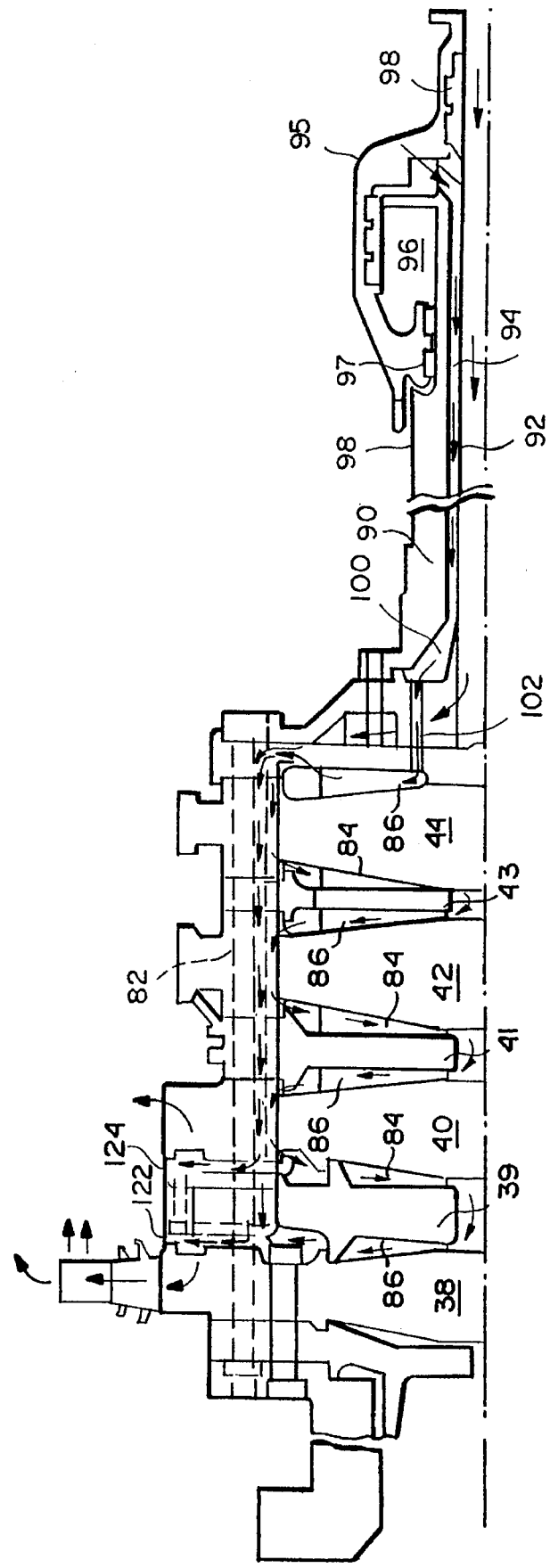

It will be also appreciated that the pathways 118 may be blocked or occluded at the axial locations of the spacer discs so that a series flow from the first aft cavity 86 into the passages 118 and into the cavities between the discs and wheels is provided as illustrated by the serpentine arrows in FIG. 4B. Consequently, a serpentine serially directed flow of cooling medium is supplied to the wheel cavities 84 and 86 from the plenum 96 via passage 94, aft plenum 100 and passages 102 with the cooling medium finally entering the cavity 86 between the rotor wheel 38 and disc 39 for flow into the supply plenum 109, preferably between the first stage wheel 38 and spacer disc 39. This serpentine flow of cooling medium in the wheel cavities minimizes any thermal gradient across the discs and thereby prevents distortion of the rotor. The tubes 112 terminate adjacent to a spacer plate 124 (FIG. 6) between spacer disc 39 and second stage wheel 40 and the pathways 118 communicate the flow through the final outlet 110 of the second stage wheel 40. Thus, cooling medium flows (dashed arrows) through the passages or boreholes 106a axially along the rims of the wheels and spacer discs into the inner cooling medium supply plenum 109 whereas the cooling medium (solid arrows) supplied through the pathways 118 defined by fluted tubes 112 and boreholes 106b flows in and out of the wheel cavities in series, forming a generally serpentine flow passageway, finally entering the forwardmost wheel cavity 86 for flow into the inner cooling medium supply plenum 109. Thus, the axial (dashed arrows) and serpentine (solid arrows) flows reunite in the inner cooling medium supply plenum 109.

Figure 6:
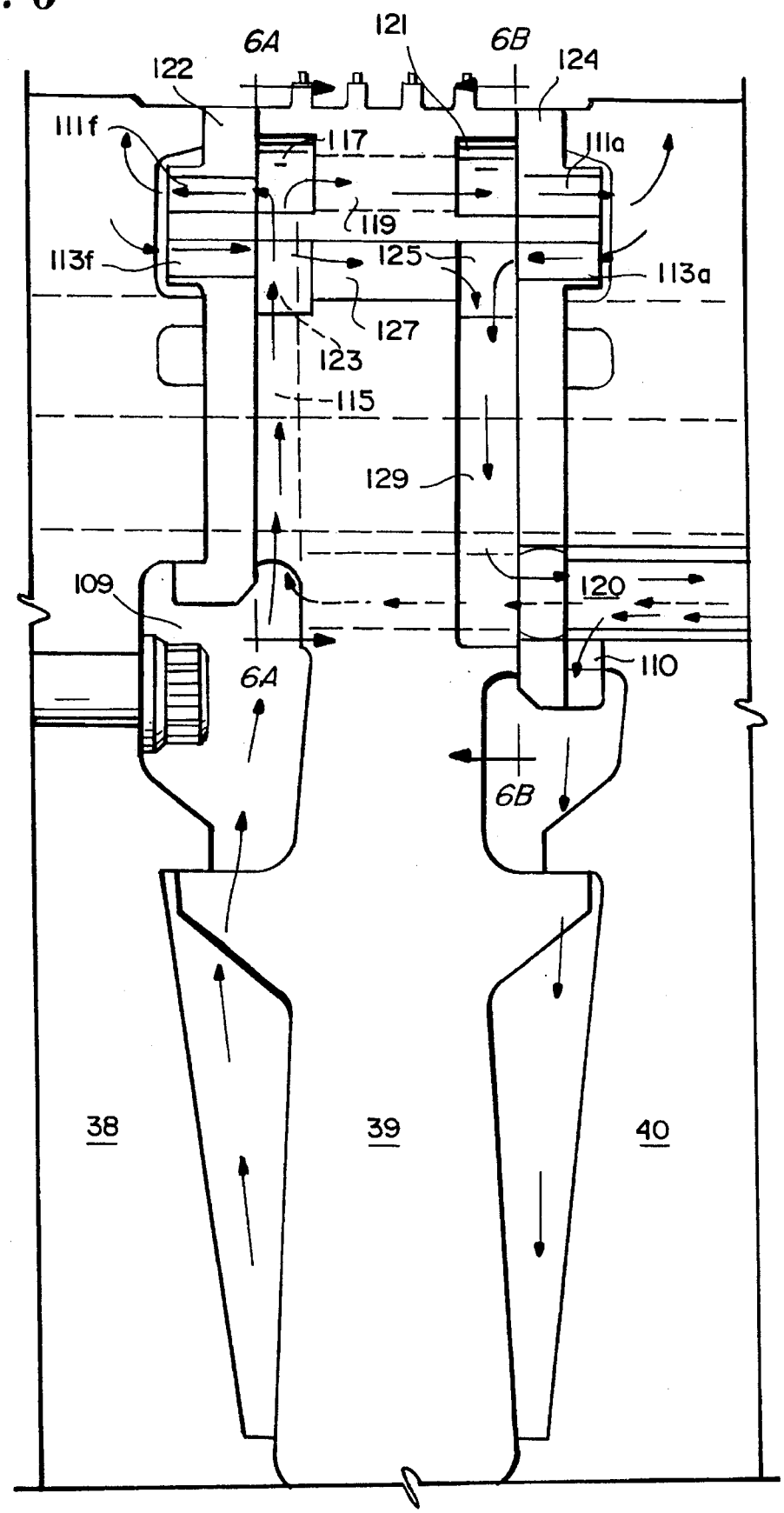
FIG. 6 is an enlarged fragmentary cross-sectional view along an axial plane of the rotor illustrating the cooling medium supply and return passages between the first and second wheel discs for flowing cooling medium to and from the buckets.
Figure 6A:
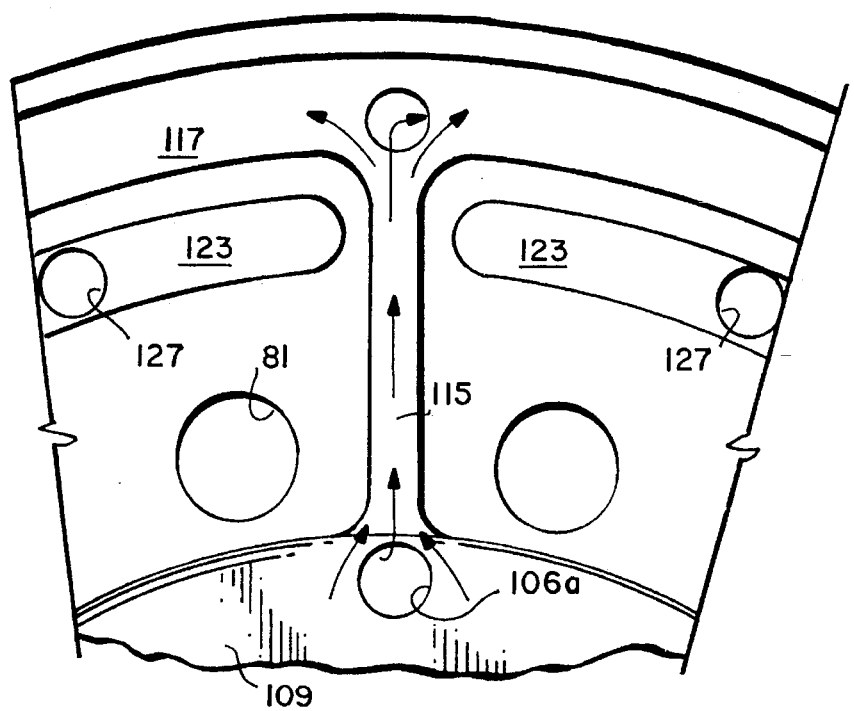
FIG. 6A is a fragmentary cross-sectional view taken along line 6A—6A in FIG. 6.
Figure 6B:
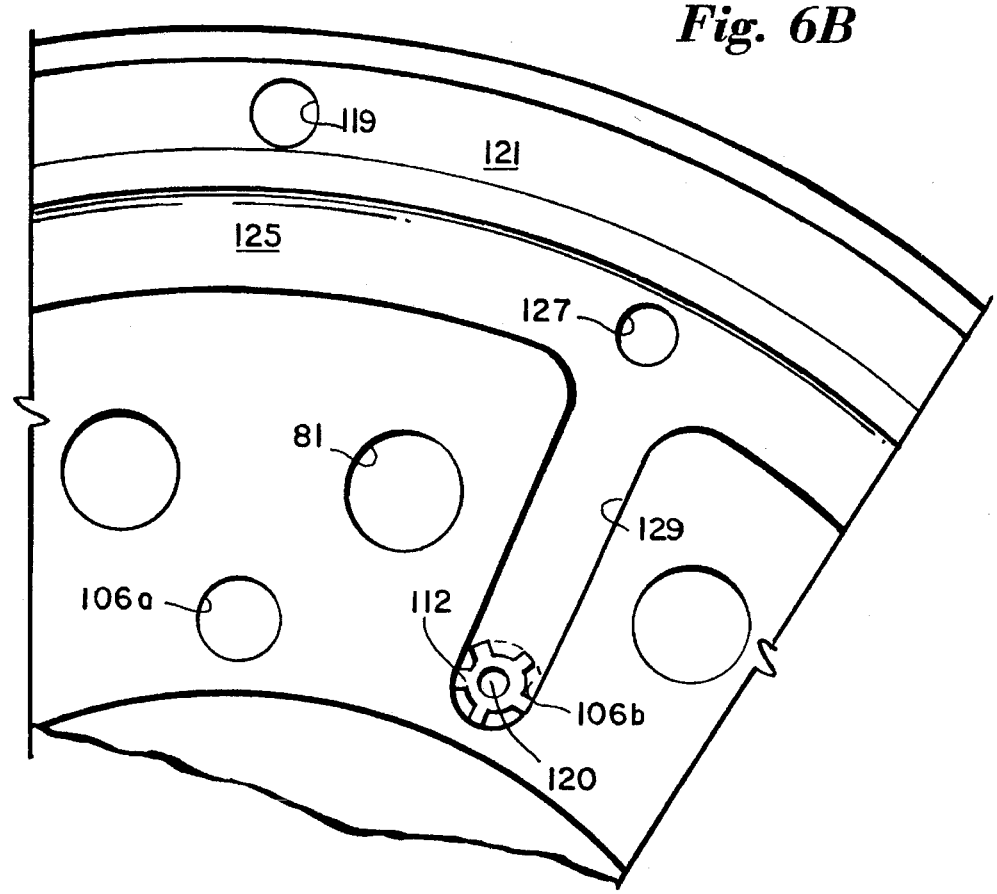
FIG. 6B is a fragmentary cross-sectional view taken generally along line 6B—6B in FIG. 6.

Referring now to FIGS. 6, 6A and 6B, the 5 transition of the flow from the inner cooling medium supply plenum 109 to the first and second stage buckets and the flows from the buckets for return in the closed circuit cooling configuration will now be described. As illustrated in FIG. 6, a spacer plate 122 is located between the first stage wheel 38 and the forward face of the spacer disc 39. As described earlier, spacer plate 124 is located between the forward face of the second stage wheel 40 and the aft face of the spacer disc 39. These spacer plates 122 and 124 have forward and aft cooling medium inlet passages 111f and 111a for flowing cooling medium from the plenum 109 into the dovetails of the first and second stage buckets. Additionally, the spacer plates 122 and 124 have forward and aft outlets 113f and 113a, respectively, for returning spent cooling medium from the buckets in a closed circuit. As described below, "spoolies" are provided for effecting transitions of the flow between the dovetails of the buckets and the inlets and outlets 111 and 113, respectively, of the spacer plates. For details of the cooling medium passages in the turbine buckets, reference is made to co-pending patent application Ser. No. 08/414,700, entitled "Closed Circuit Steam-Cooled Bucket" (Attorney Docket No. 839-352).

Referring now to FIGS. 6 and 6A, the forward face of spacer disc 39 includes a plurality of circumferentially spaced radially outwardly directed slots 115 in communication at their radially innermost ends with the inner plenum 109 and at their outer ends in an outer annular cooling medium supply plenum 117. As illustrated in FIG. 6, outer plenum 117 lies in communication with the inlets 111f through spacer plate 122 for supplying cooling medium to the bucket dovetails. It will be appreciated that the spacer plate 122 overlies the forward face of the spacer disc 39 to close the radial slots 115, enabling communication between the inner and outer plenums 109 and 117, respectively.

The aft or rearward face of the spacer disc 39 is illustrated in FIG. 6B. In FIG. 6B, a plurality of circumferentially spaced openings 119 provide communication between the outer supply plenum 117 and an additional outer supply annular plenum 121 formed in the rear face of disc 39. Outer plenum 121 lies in communication with inlets 111a for supplying cooling medium to the bucket dovetails of the second stage.

To provide a return circuit for the spent cooling medium from the buckets, the forward face of the spacer disc 39 at locations radially inwardly of outer supply plenum 117 is provided with a plurality of circumferentially spaced arcuately extending return plenum segments 123. The outlets 113f in the spacer plate 122 lie in communication with the return segments 123. The aft face of spacer disc 39 includes an annular plenum 125 radially inwardly of the supply plenum 121 and lying in communication with the return plenum segments 123 by way of a plurality of circumferentially spaced holes 127 through the rim of spacer disc 39. Additionally, return plenum 125 lies in communication with the outlets 113a from the second stage bucket. A plurality of circumferentially spaced inwardly extending slots 129 lie in communication with the return plenum 125 and the central passages 120 of the flutes 112 whereby spent cooling medium may be passed axially along the rotor rim to a return. The connection between the central passages 120 of fluted tubes 112 and the axial openings of the slots 129 in spacer plate 124 are provided with spoolies, as described below, to effect transition between the rotating parts.

In a preferred embodiment, and referring to FIGS. 6, 6A and 6B, eight radially outwardly directed slots 115 are provided for communicating cooling medium from plenum 109 to plenum 117. With the turbine wheel mounting sixty-four buckets, sixty-four inlet openings 111f are provided in communication with the annular outer supply plenum 117. Eight circumferentially spaced openings 119 provide communication between the plenums 117 and 121. Because the second stage turbine wheel mounts sixty-four buckets, sixty-four inlet passages 111a communicate between the annular plenum 121 and those buckets. On the return side, sixty-four outlets 113f communicate with eight return plenum segments 123, there being eight outlets 113f communicating with each segment 123. Sixteen circumferentially spaced holes 127 communicate between return plenum segments 123 and annular return plenum 125, there being two holes 127 for each return plenum segment 125. Twelve radially inwardly directed slots 129 communicate between annular return plenum 125 and the twelve central passages 120 of the fluted tubes 112.

Consequently, where steam cooling is required, steam is supplied from plenum 96 via annular passage 94, aft plenum 100, passages 102, the aft cavity 86 and the passages through boreholes 106. A number of the boreholes 106, namely boreholes 106a, supply steam directly along the rims of the wheels and spacer discs to the plenum 109. The fluted pathways 118 of boreholes 106b provide steam serially through the cavities 84 and 86 in serpentine fashion, with the steam finally reuniting with the steam flow through passages 106a in the plenum 109. From plenum 109, cooling steam flows along radially outwardly directed slots 115 into plenum 117 for flow in opposite axial directions. The flow in a forward direction passes through the sixty-four inlets 111f for supplying cooling steam to each first stage bucket. The flow in the aft direction passes through the eight openings 119 into the annular plenum 121 for supplying through the sixty-four inlets 111a steam to the second stage buckets. On the return side, the spent steam from the first stage buckets passes through outlets 113f into return plenum segments 123 for passage through sixteen holes 127 into the radially inner annular return plenum 125. Spent steam from the second stage buckets passes through the sixty-four outlets 113a into the return plenum 125. The spent steam then passes radially inwardly along the twelve slots 129 for return through the twelve central passages 120 of the fluted tubes 112. It will be appreciated that the supply of steam cools the wheel rims, the wheel cavities and the buckets of the first and second stages and returns in a closed circuit.

Significantly, when the rotor is steam-cooled, the steam flow radially inwardly in the cavities 84 for passage between opposite sides of the spacer discs effects a cleansing of the steam due to centrifugal forces whereby steam impurities are removed from the cooling steam and deposited radially outwardly in the cavities. That is, as the rotor spins, particulate impurities in the steam are impelled radially outwardly by centrifugal force whereas the steam pressure forces the steam to flow radially inwardly and outwardly as the steam flows through the cavities in a generally serpentine path whereby steam substantially free of such impurities is supplied the first and second stage buckets. This process is repeated in each of the three cavities 84 thus cleaning the steam internally of the rotor. Additionally, as part of the cooling steam travels through the passages 118, those cooler passages insulate the wheel and disc rim structures from the hot return steam.

Where an air-cooled turbine is required, the identical structure provided for steam cooling may also be used for air cooling of the rotational parts of the turbine. Both the supply and return circuits for steam cooling are used for supplying cooling air to the first and second stage buckets. Thus air may be supplied through the inner plenum 109 for flow to the first and second stage turbine buckets as described above in connection with flowing steam to those buckets. Air is also supplied to plenum 109 by the previously described serpentine supply passages. Air is further supplied via passage 120 within fluted tubes 112 and through the slots 129, plenum 125 and outlets 113f and 113a to the first and second stage buckets. Because the air cooling circuit is open and the air flows through the turbine buckets and exits for bucket film cooling into the hot gas path, no return path for the air is necessary.

Figure 7:
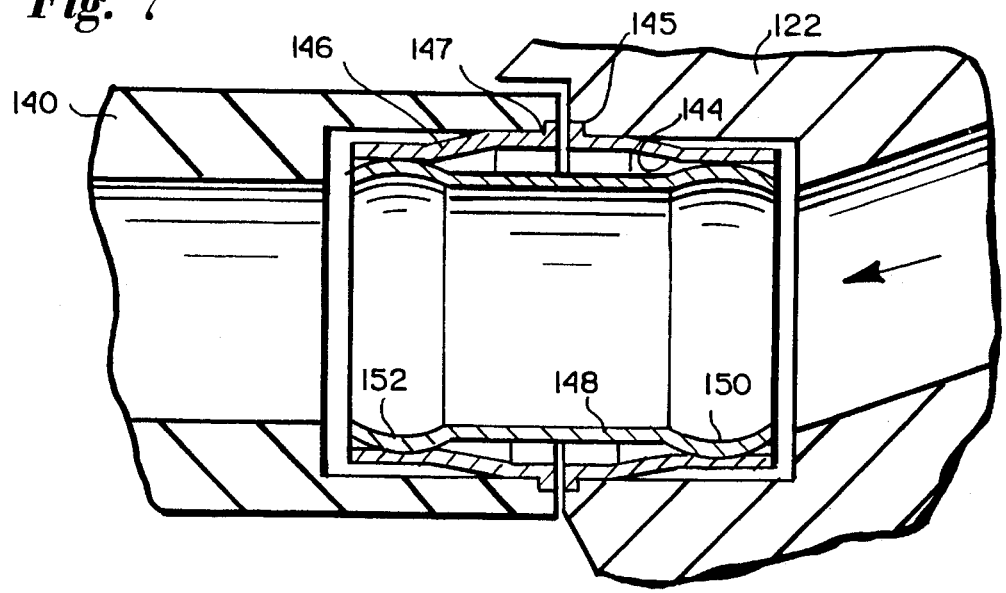
FIGS. 7, 7A and 7B are enlarged cross-sectional views of various embodiments of axial "spoolies" for transitioning the cooling medium between adjacent parts of the rotor assembly.

Referring now to FIG. 7, it will be appreciated that there is an axial transition between the spacer plates 122 and 124 and the first and second stage buckets, respectively, which, due to different rates of thermal growth or expansion, may have relative motion. Because performance can be degraded by steam leakage into the hot gas path, it is important to absorb the relative thermal growth at these transition areas and provide an effective seal. In FIG. 7 there is disclosed a "spoolie" assembly for transitioning the flow of cooling medium to and from the spacer plates 122 and 124 and the respective buckets. Thus, a turbine bucket is illustrated in FIG. 7 at 140 and the spacer plate 122. The cooling supply passage in the spacer plate 122 is indicated by the arrow. The axial spoolie comprises a pair of bushings 144 and 146 received in registering recesses in the spacer plate 122 and bucket 140, it being appreciated that a spoolie arrangement is used at each juncture of the spacer plate passage and associated bucket. Bushings 144 and 146 are tubular and their adjacent ends are provided with flanges 145 and 147, respectively, forming an interference fit with corresponding grooves. The bushings taper radially inwardly from their flanged ends to space the bushings from the walls of the recesses, the bushings being otherwise unsecured to the spacer plate 122 and bucket 140. A spoolie 148 comprises an axially extending tube having bulbous ends 150 and 152. The bulbous ends 150 and 152 form interference fits adjacent and hence seal with the respective free ends of bushings 144 and 146. The purpose of the bushings is to minimize the thermal mismatch between the spoolie and its support structure, thus reducing the amount of wear from relative sliding motion. Bearing stress at the spoolie 148 and bushing interfaces is also reduced by sizing the bushing support length at the spoolie interface to be of near equal or lesser stiffness. The spoolie assembly is also constructed as flexible as possible to reduce spoolie/bushing bearing stress due to centrifugal loads and to reduce wear at the spoolie/bushing interfaces due to spoolie/structural thermal equalization. The spoolie and bushing are preferably formed of a nickel-based alloy.

Figure 7A:
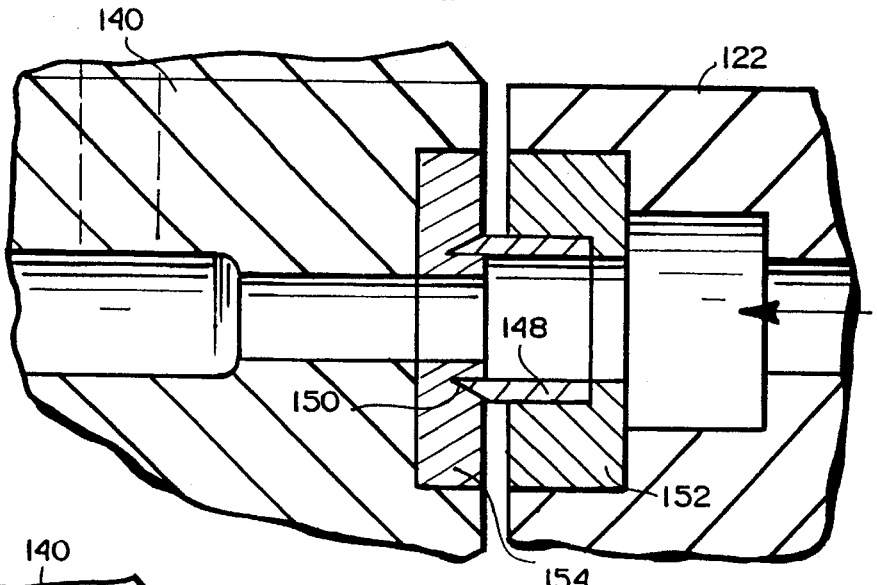

Referring to FIG. 7A, there is illustrated a further form of spoolie assembly for transitioning the flow of cooling medium between the spacer plates and buckets compensating for any thermal mismatch therebetween. In FIG. 7A, a cylindrical knife 148 having a knife edge 150 is carried by a closure ring 152 disposed in a recess in the spacer 122. The knife edge 150 is embedded into a temperature-resistant soft metal alloy ring 154 forming a seal therewith.

Figure 7B:
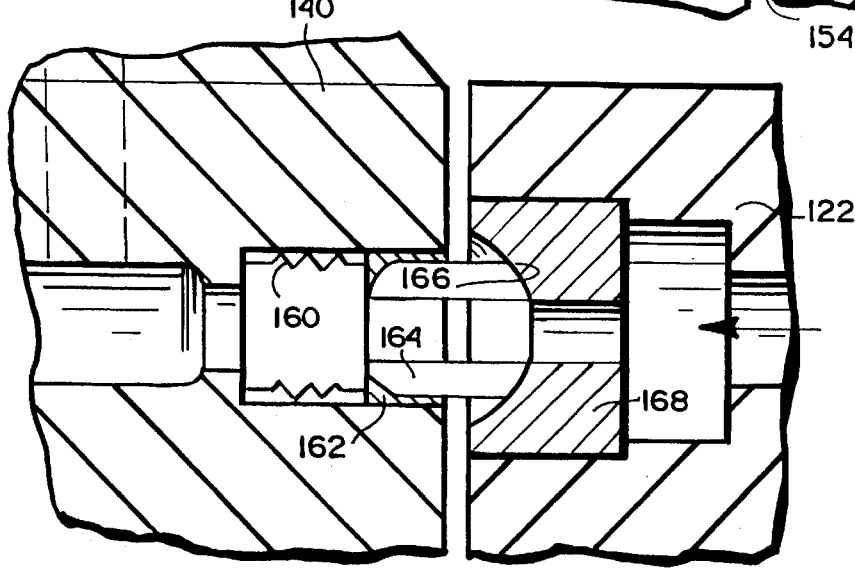

In the spoolie assembly of FIG. 7B, a compression spring 160 bears against the base of a recess in the bucket 140 and, at its opposite end, against an expansion ring 162. Ring 162 has a flat tapered surface for sealingly interfacing with a spherically-shaped surface on an annular sealing plug 164. Sealing plug 164 in turn has a spherical sealing surface 166 at its opposite end for sealing engagement against a convex spherical closure ring 168 mounted in a recess of the spacer plate 122.

Referring now to FIG. 8, there is illustrated a further form of a spoolie assembly for transitioning between the spacer 122 and a turbine bucket 140. In this form a thermally balanced spoolie and sleeve assembly is provided. Thus, a tubular bushing 170 having a flange 172 is connected to the spacer plate 122 adjacent the outer end of the cooling passage and a similar bushing 174 is connected by a flange 176 to the inlet end of the bucket 140. The flanges 172 and 176 support the otherwise unsupported spoolie assembly at the juncture of the bucket and spacer plate. A sleeve 178 extends from flange 172 and is spaced between the walls of the passage and bushing 170 terminating at its inlet end in a radially inwardly directed bulbous configuration 180 having a series of apertures 182. A plurality of apertures 183 are disposed at the end of sleeve 178 adjacent flange 172. A similarly constructed sleeve 184 is disposed at the inlet end of the bucket spacing the bushing 174 from the walls of the bucket inlet and terminating in a radially inwardly directed bulbous end 186 with openings 188. A plurality of apertures 189 are disposed at the end of sleeve 184 adjacent flange 176. A tubular spoolie 190 having radially outwardly directed bulbous ends 192 and 194 are disposed within the bushings 170 and 174 forming an interference fit therewith. Consequently, as indicated by the arrows, the cooling medium flows on opposite sides of the sleeve 178 and reenters the main stream through openings 182 affording a thermal balance across the sleeve 178, bushing 170 and spoolie 190. At the outlet end of the spoolie assembly, the cooling medium flows between the bushing 174 and sleeve 170 through the apertures 189 into the space between bushing 170 and the wall of the inlet opening and radially inwardly through the openings 188 into the main inlet passage. Consequently, relative motion between the spacer plate and turbine bucket due to thermal mismatch is accommodated by the spoolie assembly.

Figure 9:
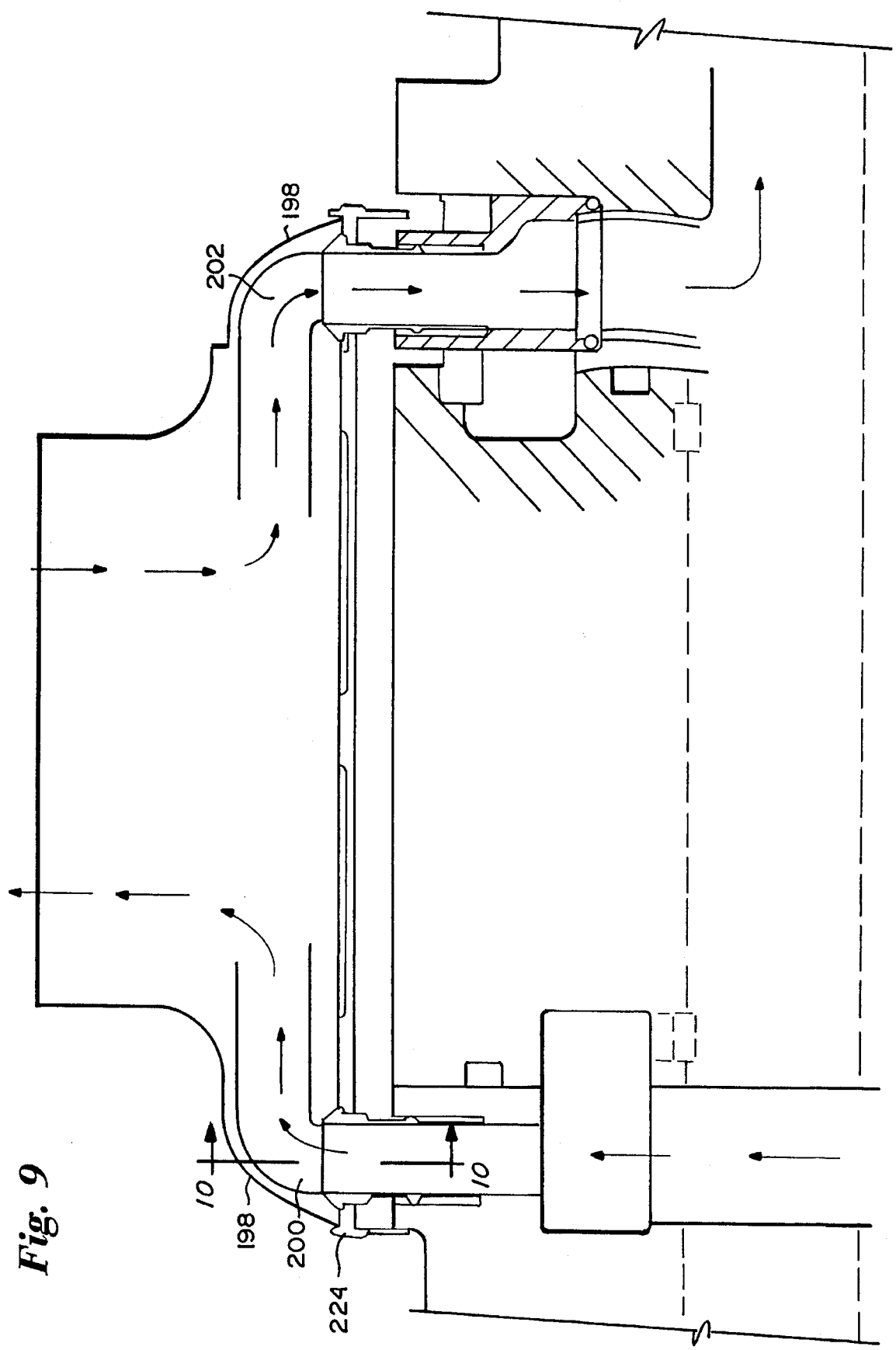
FIG. 9 is an enlarged schematic illustration of a bucket attached a wheel rim illustrating a radial spoolie arrangement for flowing cooling medium.

Referring now to FIG. 9, there is illustrated a radial spoolie arrangement for flowing cooling medium radially outwardly from the wheel rim into a turbine bucket and affording a return path for the medium, where steam cooling is utilized. Axial extensions 198 are provided on the turbine buckets affording radially inwardly directed openings 200 for receiving the cooling medium. A similar opening 202 is provided at the axially opposite side of the turbine bucket for exiting steam from the bucket or supplying air to the bucket. Where a radial spoolie is used, it will be appreciated that such spoolie must accommodate the sliding movement of the turbine bucket relative to the bucket wheel upon installation and removal of the bucket while simultaneously after installation affording an appropriate seal between the two parts such that any thermal growth does not affect the seal.

Figure 10:
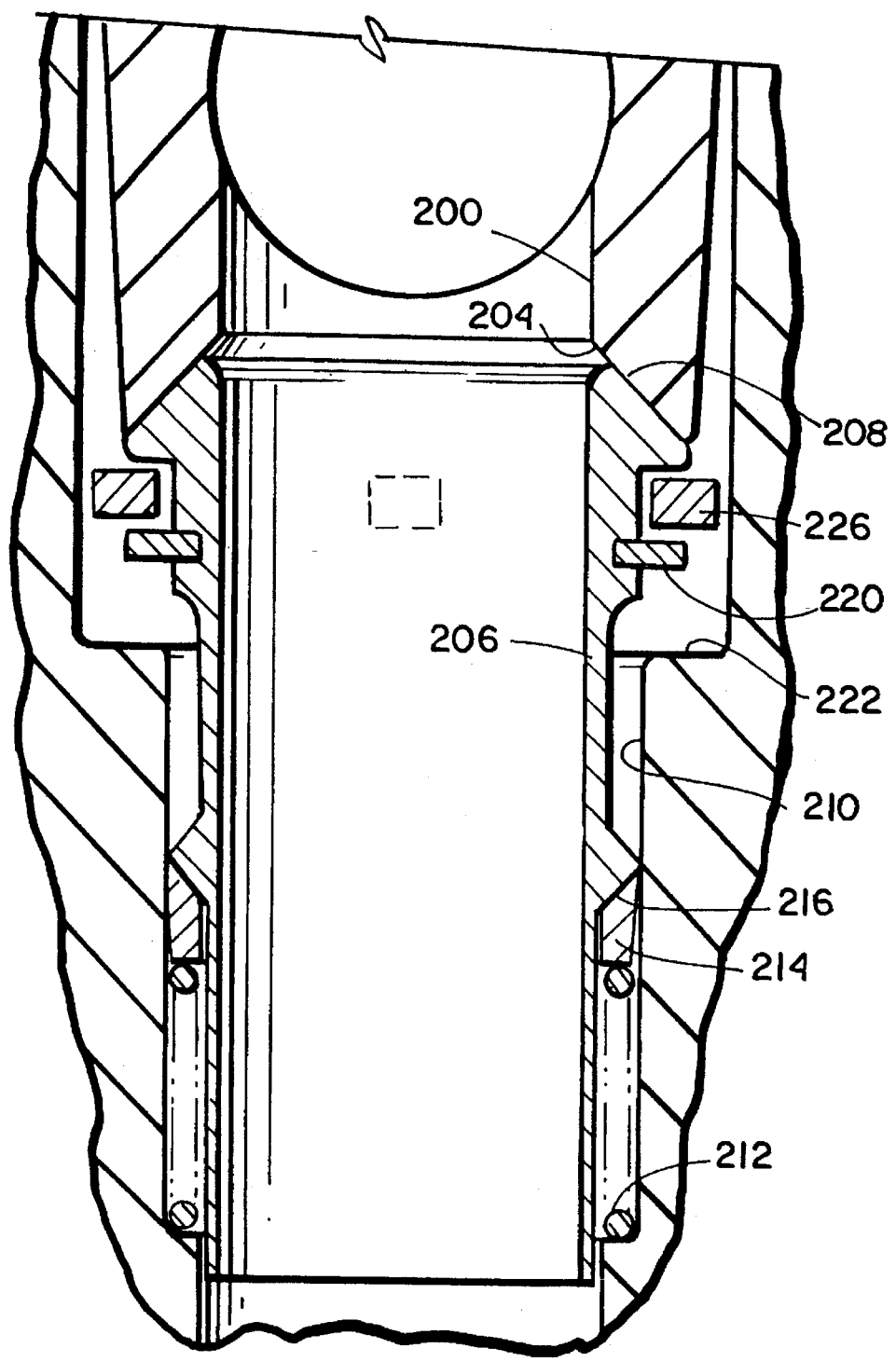
FIG. 10 is an enlarged cross-sectional view of a portion of the spoolie illustrated in FIG. 9.

To those ends, and with reference to FIGS. 9 and 10, the bucket inlet 200 terminates in an outwardly tapered flat sealing surface 204. The spoolie 206 comprises a generally tubular element terminating at its radial outer end in a convex spherical surface 208 for engagement with the flat tapered surface 204 in sealing relation therewith. The tubular spoolie 206 extends into an opening 210 of the wheel rim and is biased for radial outward movement by a spring 212. The spring bears against a sealing ring 214 having a sealing surface 216 for engaging a complementary surface formed along the outer edge of the tubular spoolie 206. These parts cooperate to form a seal between the tubular spoolie 206 and the interior walls defining the opening 210. A stop ring 220 is disposed about the radially outer upper portion of spoolie 206 for engagement against a shoulder 222 upon displacement of the tubular spoolie 206 radially inwardly to locate the radial outer end of the spoolie below the interface of the bucket. A forked element 224 having prongs 226 is disposed above ring 220 and serves as a tool for displacing the tubular spoolie 206 radially inwardly against the bias of spring 212 enabling the bucket to slide along the typical tongue-and-groove connection between the bucket and wheel and over the spoolie. The tool can then be released to permit the spoolie to be displaced radially outwardly to engage the spherical bearing surface 208 against the tapered sealing surface 204 of the bucket. Thus, a seal is effected between the bucket wheel and buckets using a radial spoolie which effectively nullifies any effect of movement between the parts due to thermal mismatch.

Figure 11A:
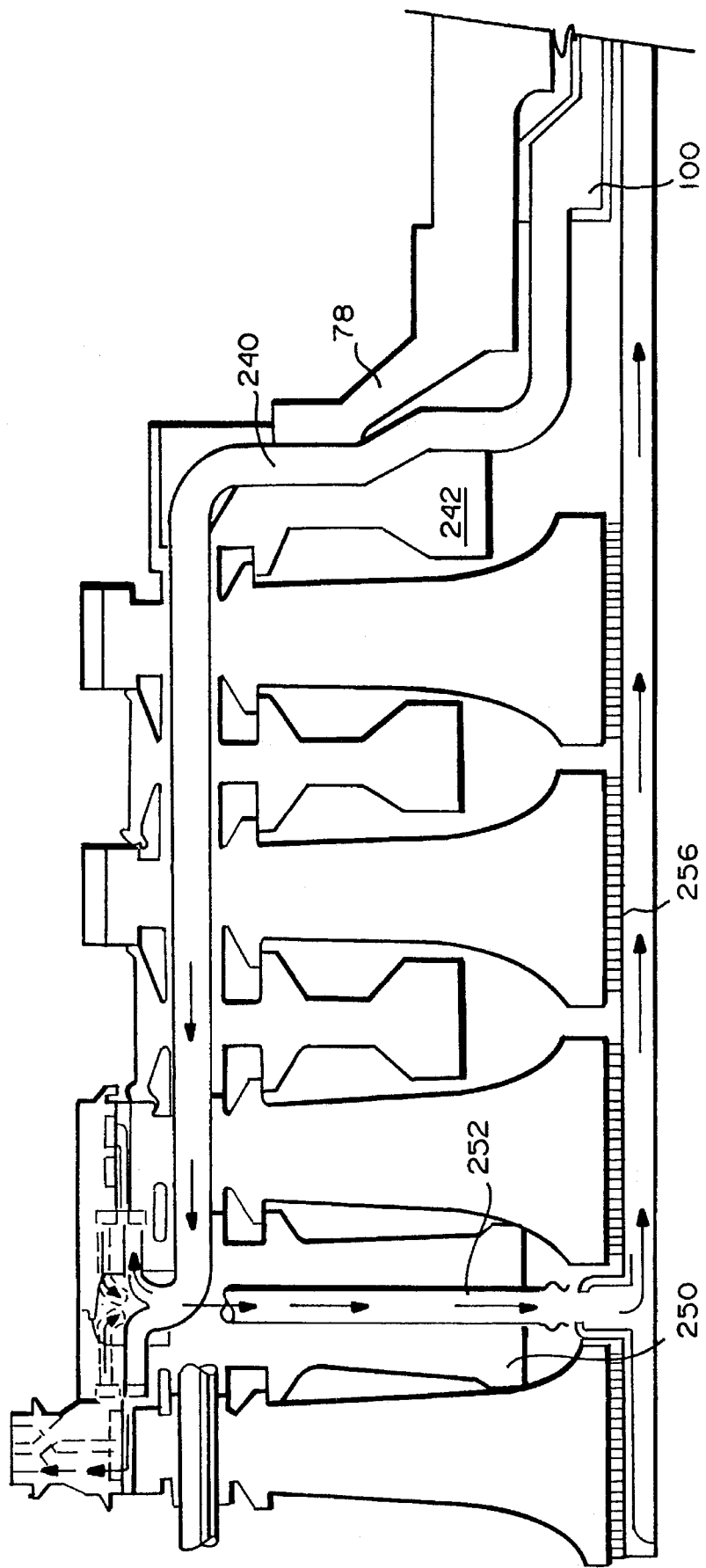
FIG. 11A is an enlarged fragmentary schematic illustration of a further form of cooling circuit for a turbine rotor.
Figure 11B:
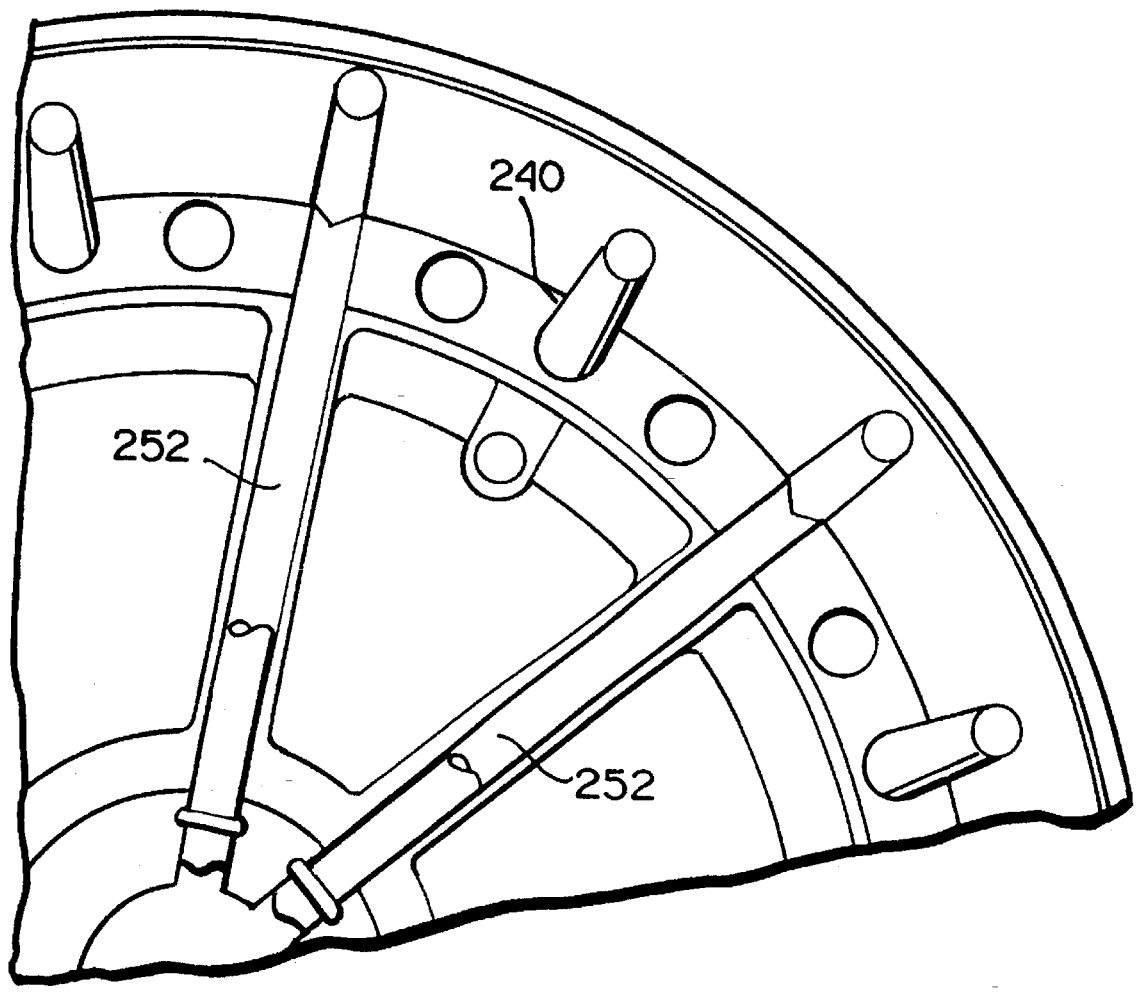
FIG. 11B is an fragmentary enlarged end elevational view thereof.

Referring now to FIGS. 11A and 11B, there is illustrated a further form of a steam cooling circuit for a turbine rotor which employs separate piping and a return path where steam cooling is used through the center of the rotor. Additionally, the wheel cavities are non-pressurized and the cooling medium is not in contact with the wheel discs. In this form, the aft plenum 100 is provided with a plurality of circumferentially spaced pipe connections 240 which extend radially outwardly between the aft spacer 242 and end disc 78. The pipes 240 extend axially through the spacer discs and wheels to a location within the forward spacer disc 250. The pipes split in essentially a "Y" connection for axial delivery of cooling medium into the first and second stage buckets. The flow then turns within the first and second stage buckets in radial directions for cooling flow along the buckets. It will be appreciated that axial spoolies are used to make the transition between the cooling pipes and the buckets. Similar axial return spoolies are also used to effect the transition from the buckets to return pipes 252. Return pipes 252 communicate directly with the return spoolies and direct the spent cooling flow radially inwardly to the center of the rotor. The central portion of the rotor is defined by an axial tube 256 coaxially of the machine. Air cooling may also be used in this rotor configuration by supplying air through both the pipes 240 and 252.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:

a multi-stage rotor having an axis and including a plurality of turbine wheels having rims for mounting turbine buckets and spacer discs having rims, said spacer discs being disposed alternately between the wheels and defining wheel cavities therebetween, said wheels and spacer discs being secured to one another;

a reservoir for supplying a cooling medium to the rotor;

a plurality of generally axially extending passages through the wheel and spacer disc rims and in communication with said cooling medium supply reservoir for supplying the cooling medium to the turbine buckets of at least one stage of the rotor; and said rotor having a passageway in communication with said cooling medium supply reservoir for supplying cooling medium into the wheel cavities and passing the cooling medium therefrom into the turbine buckets of said one stage.

2. A turbine according to claim 1 wherein said passageway includes an inlet and an outlet in adjacent wheel rims on opposite sides of at least one of said spacer discs, said inlet and said outlet being positioned to flow the cooling medium from said outlet radially inwardly along one side of said one spacer disc and radially outwardly along the opposite side of said spacer disc for flow through the inlet.

3. A turbine according to claim 1 wherein said axial passages comprise first and second sets of registering boreholes through the wheel rims and spacer discs, at least one tube in each borehole of said second set thereof defining a pathway dedicated to supplying cooling medium serially through said cavities and a return passage for spent cooling medium from the buckets.

4. A turbine according to claim 3 wherein said one tube is fluted with at least an adjacent pair of lobes thereof engaging an interior wall of the borehole to define said discrete supply pathway for supplying cooling medium axially along the wheels and rims to said cavities.

5. A turbine according to claim 1 including generally radially extending slots between first and second stage wheel rims in communication with said passageway through said cavities for directing the cooling medium from said cavities into the buckets of said one stage.

6. A turbine according to claim 1 including generally radially extending slots between first and second stage wheel rims in communication with said axial passages for directing the cooling medium from said cavities into the buckets of said one stage.

7. A turbine according to claim 1 including first and second rotor stages, generally radially extending slots between the first and second stage wheel rims in communication with said passageway through said cavities and with said axial passages for directing the cooling medium from said cavities and passages into the first and second stage buckets.

8. A turbine according to claim 1 including first and second rotor stages, at least one annular supply plenum between said first and second stage wheel rims, generally radially extending slots between the first and second stage wheel rims in communication with said passageway through said cavities and with said axial passages for directing the cooling medium from said cavities and said passages into said supply plenum for flow to the first and second stage buckets.

9. A turbine according to claim 8 including a return plenum between said first and second stage wheel rims in communication with the first and second stage buckets for receiving spent cooling medium, at least one return passage carried by said rotor, generally inwardly radially extending slots between the first and second stage wheel rims in communication with said return plenum for directing spent cooling medium from said plenum to said return passage.

10. A turbine according to claim 1 wherein said multistage rotor includes first and second stages having respective first and second stage wheel rims and respective first and second stage buckets, a return plenum between said first and second stage wheel rims in communication with said first and second stage buckets for receiving spent cooling medium, at least one return passage carried by said rotor, generally inwardly radially extending slots between the first and second stage wheel rims in communication with said return plenum for directing spent cooling medium from said plenum to said return passage.

11. A turbine according to claim 1 including first and second rotor stages, at least one supply plenum between said first and second stage wheel rims, generally radially outwardly extending slots between the first and second stage wheel rims in communication with said passageway through said cavities and with said axial passages for directing the cooling medium from said cavities and said passages into said supply plenum for flow to the first and second stage buckets, a return plenum between said first and second stage wheel rims in communication with the first and second stage buckets for receiving spent cooling medium, at least one return passage carried by said rotor, generally radially inwardly extending slots between the first and second stage wheel rims in communication with said return plenum for directing spent cooling medium from said plenum to said return passage, said supply and return plenums being formed in opposite faces of the spacer disc between the first and second stage wheel rims, one of said plenums lying in communication with a plurality of plenum segments extending generally circumferentially about the rims and being circumferentially spaced from one another, each of said plenum segments lying in communication with a predetermined number of flow ports for the buckets for flow of cooling medium between the buckets and plenum segments.

12. A turbine according to claim 1 including a plurality of return passages extending axially through the wheel and spacer disc rims for returning spent cooling medium from the turbine buckets to a return external of the rotor.

13. A turbine according to claim 1 in combination with the turbine buckets, a spacer plate between one of said spacer discs and the wheel forming said one stage and having a plurality of cooling medium flow ports in communication with said passages and said passageway, said buckets having a plurality of cooling medium ports in registration with said spacer plate ports for flow of cooling medium therethrough, transition assemblies for sealing between said ports of said spacer plates and said buckets and enabling flow of cooling medium therethrough, each said transition assembly including a pair of tubular bushings sealingly secured at one end to said registering ports, respectively, said bushings at locations remote from said one end thereof being spaced from interior walls of said ports, and a coaxial tubular element extending within and between said bushings terminating in ends engaging said bushings forming a seal enabling flow of cooling medium through said ports through said tubular element with reduced stress from thermal mismatch between the buckets and spacer plate.

14. A turbine according to claim 13 wherein opposite ends of said tubular element are bulbous for sealing interference fits with the walls of the bushings spaced from the ports.

15. A turbine according to claim 1 wherein said passageway is arranged for supplying cooling medium in series into the wheel cavities.

16. A turbine according to claim 1 wherein said passageway includes a plurality of circumferentially spaced inlets and outlets in adjacent wheel rims on opposite sides of at least one of said spacer discs and flow pathways through and generally axially along said adjacent wheel rims, said outlets being positioned to enable flow of the cooling medium from said outlets generally inwardly along one side of said one spacer disc and said inlets being positioned to enable flow of the cooling medium generally outwardly along the opposite side of said one spacer disc for flow through the inlets whereby said pathways and said inward and outward flows form a generally serpentine passageway.

17. A turbine according to claim 1 in combination with the turbine buckets, the wheel forming part of said one stage having a plurality of cooling medium flow ports in communication with said passages and said passageway, said buckets having a plurality of cooling medium ports in registration with said wheel ports for flow of cooling medium therethrough, transition assemblies for sealing between said ports of said wheel and said buckets and enabling flow of cooling medium therethrough, each said transition assembly including a tubular bushing slidably and sealingly secured in a registering port of said wheel adjacent the juncture of a bucket and said wheel, a spring for biasing said bushing for movement toward said bucket, a spherical sealing surface carried by said bushing at one end thereof, a seat carried by said bucket in a registering port thereof, said bushing being slidable within the wheel port in a direction away from the bucket and against the bias of the spring upon sliding engagement of the bucket onto the wheel and in a direction toward the bucket under the bias of the spring to seal the spherical surface of the bushing and the seat to one another in response to finally locating said bucket on said wheel.

18. A turbine comprising:

a multi-stage rotor having an axis and including a plurality of turbine wheels having rims for mounting turbine buckets and spacer discs having rims, said spacer discs being disposed alternately between the wheels and defining wheel cavities therebetween, said wheels and spacer discs being secured to one another;

a reservoir for supplying a cooling medium to the rotor;

a plurality of generally axially extending passages in communication with said cooling medium supply reservoir and passing axially through the wheel and spacer disc rims for supplying the cooling medium to the turbine buckets of at least one stage of the rotor; and a plurality of radially inwardly directed passages in communication with the turbine buckets of said one stage for flowing spent cooling medium to an axially extending return pathway.

19. A transition assembly for sealing between registering ports of adjacent discrete first and second parts at a juncture of the parts, enabling flow of a cooling medium between the ports, comprising:

tubular bushings sealingly secured at one end to said ports, respectively, at the juncture of the first and second parts and extending into said parts, respectively, said bushings at locations remote from said one end thereof being spaced from interior walls of the ports, respectively; and a coaxial tubular element extending within and between said bushings terminating in ends engaging said bushings forming a seal enabling flow of cooling medium between said parts through said tubular element with reduced stress from thermal mismatch between the first and second parts.

20. A transition assembly according to claim 19 wherein said tubular element has bulbous ends for engaging interior walls of said bushings for a seal therewith.

* * * * *